United States Patent [19]

Armstrong et al.

[11] Patent Number: 4,537,107
[45] Date of Patent: Aug. 27, 1985

[54] APPARATUS FOR SEVERING STRAND

[75] Inventors: Gordon P. Armstrong, Newark; Martin C. Flautt, Granville; Gary L. Williams, Newark, all of Ohio

[73] Assignee: Owens-Corning Fiberglas Corporation, Toledo, Ohio

[21] Appl. No.: 613,854

[22] Filed: May 24, 1984

[51] Int. Cl.³ .......................... B26D 1/02; B26D 1/04
[52] U.S. Cl. ...................................... 83/694; 83/580; 83/913
[58] Field of Search ................. 83/580, 694, 693, 679, 83/916, 692, 701, 913

[56] References Cited

U.S. PATENT DOCUMENTS

| 2,041,386 | 5/1936 | Van Laanen | 83/580 X |
| 3,154,992 | 11/1964 | Sahlin | 83/913 X |
| 3,793,917 | 2/1974 | Flower et al. | 83/580 X |
| 4,312,256 | 1/1982 | Herzog et al. | 83/694 |

Primary Examiner—Donald R. Schran
Attorney, Agent, or Firm—Ronald C. Hudgens; Greg Dziegielewski

[57] ABSTRACT

Apparatus for severing a moving, heavy strand of coated glass filaments is comprised of a conically shaped cutting head having a circular cutting edge that cooperates with a circular die into which the cutting head is moved upon activation.

4 Claims, 4 Drawing Figures

APPARATUS FOR SEVERING STRAND

TECHNICAL FIELD

The invention disclosed herein relates to apparatus for severing strand, particularly a strand comprised of a large number of glass filaments impregnated with a tough but pliable coating.

BACKGROUND

Running strands may be required to be severed quickly and cleanly. Depending upon the type of strand involved, the prior art devices have taken many shapes.

The present invention provides a relatively compact apparatus capable of quickly and reliably severing a strand comprised of a large number of glass filaments embedded within a tough but pliable coating as the strand is advancing past the device.

DISCLOSURE OF THE INVENTION

This invention pertains to apparatus comprised of a cutting head linearly movable along an axis, the cutting head having a base section and a conical section, the base section having a cutting edge along the periphery thereof; motive means for moving the cutting head between an extended position and a retracted position; a die having a bore adapted to slidably receive the cutting head, the bore of the die having a cutting edge at the periphery thereof to cooperate with the cutting edge of the base section of the head to sever the strand as the cutting head moves from the extended position to the retracted position within the die, the conical section of the head being adapted to permit the strand to slide transversely over the cutting head into a region intermediate the head and die as the head is moved from the retracted position to the extended position.

BEST MODE OF CARRYING OUT THE INVENTION

Figure 1:
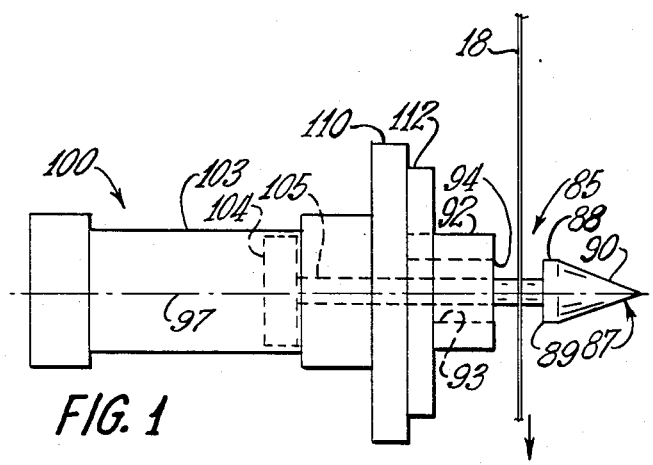
FIG. 1 is a side view of a strand severing device according to the principles of this invention wherein the cutting head is in the extended position.
Figure 4:
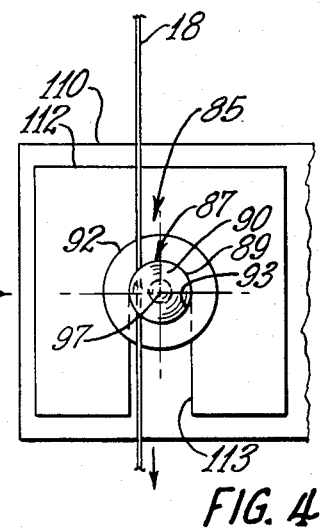
FIG. 4 is a front view of the apparatus shown in FIG. 1.
Figure 2:
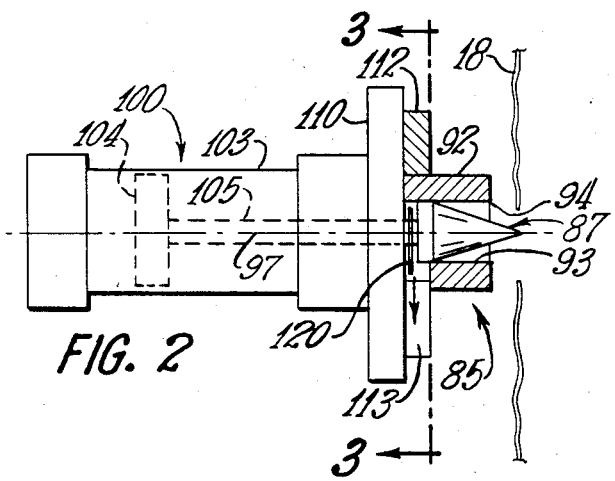
FIG. 2 is a side view of the apparatus according to the principles of this invention, partially in section, wherein the cutting head is in the retracted position.
Figure 3:
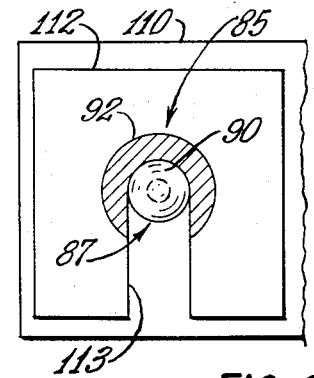
FIG. 3 is a cross sectional view of the apparatus shown in FIG. 2 taken along view 3—3.

According to the principles of this invention, the strand severing means or apparatus 85 is comprised of a movable cutting head 87, a casing or die 92 and motive means 100 for moving the cutting head 87 between an extended position, as shown in FIG. 1, and a retracted position, as shown in FIG. 2 to sever strand 18.

Cutting head 87 is comprised of a circular base section 88 having a cutting edge 89 extending around the periphery thereof. Opposite cutting edge 88 a conical section 90 projects from base section 88. The taper of the conical section 90 permits the strand 18, which is generally advancing past severing means 85 generally perpendicular to the path or axis of movement 97 of cutting head 87, to slide transversely, i.e., along or parallel to the axis of movement 97 of cutting head 87, over the cutting head 87 into a region intermediate the cutting head 87 and die 92 as cutting head 87 is moved from the retracted position to the extended position. As such, the taper of the conical section permits the cutting head to be extended in the absence of unduly disrupting the advancement of strand 18 therepast.

Casing or die 92 includes a bore 93 adapted to slidably receive cutting head 87. Die 92 also includes a cutting edge 94 at the peripheral entrance of bore 93 to cooperate with cutting edge 89 of head 87 in severing strand 18 when the severing means 85 is activated.

Die 92 is fixedly positioned in slot 113 of spacer 112. Slot 113 is in communication with bore 93 to permit the severed strand sections 120 to fall from within unit 85.

Cutting head 87 is extended and retracted by means of actuator or motive means 100. Actuator 100 may be of any suitable type capable of quickly retracting cutting head 87 into die 92 with a force sufficient to sever the particular strand involved.

As shown, actuator 100 is comprised of a pneumatic cylinder 103 having a movable piston 104 therein. Rod 105 of actuator 100 connects cutting head 87 with piston 104. Pneumatic cylinder 103 is connected to a suitable source of pressurized air (not shown) and, for example, a selenoid operated valve means (not shown), which may be manually or automatically operated to control the supply of pressurized air to pneumatic cylinder 103 to drive piston 104, and thus cutting head 87, back and forth as desired. Actuator 100 and spacer 112 are attached to mounting plate 110 by any suitable means, such as screw type fasteners.

The circular shape of the cutting edges 89 and 94 also permit cutting head 87 to rotate about the axis of rod 105 to extend the service life of unit 85. As such, the piston 104 or rod 105 and/or cutting head 87 need not, and preferably is not, keyed to prevent the rotation thereof since the circular cutting edges need only be aligned along a common axis.

Since rod 105 extends along the center line or axis 97 of circular cutting edge 89, the advancing strand 18 will tend to cause a slight rotation of cutting head 87 about the axis 97 as the cutting head 87 grasps and then severs strand 18 when the severing means or unit 85 is actuated. Thus, the severing unit 85 is self-rotating or compensating with regard to cutting edge 89 of head 87 to permit head 87 to be rotatably indexed for substantially even wear throughout the service life of head 87.

Cutting head 87 and die 92 may be made of any suitable material, such as hardened steel.

Severing means 85 has been shown to be effective in severing "heavy" strands comprised of a large number of glass filaments impregnated with a tough but pliable resinous coating.

It is apparent that within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber and/or textile industry.

We claim:

1. Apparatus for severing a strand comprising:
   a cutting head linearly movable along an axis, the cutting head having a base section and a conical section, the base section having a cutting edge along the periphery thereof, motive means for moving the cutting head between an extended position and a retracted position;

a die having a bore adapted to slidably receive the cutting head, the bore of the die having a cutting edge at the periphery thereof to cooperate with the cutting edge of the base section of the head to sever the strand as the cutting head moves from the extended position to the retracted position within the casing, the conical section of the head being adapted to permit the strand to slide transversely over the cutting head into a region intermediate the head and die as the head is moved from the retracted position to the extended position.

2. The apparatus of claim 1 wherein the bore of the die is adapted to permit sections of severed strand to pass therethrough.

3. The apparatus of claim 1 wherein the cutting head is rotatable about said axis.

4. The apparatus of claim 3 wherein the contact of the cutting head with the strand advancing thereby tends to rotate the cutting head about said axis.

* * * * *